Sept. 24, 1963
G. A. WOOD
3,104,850
FREE SPOOL CASTING REEL
Filed July 20, 1961
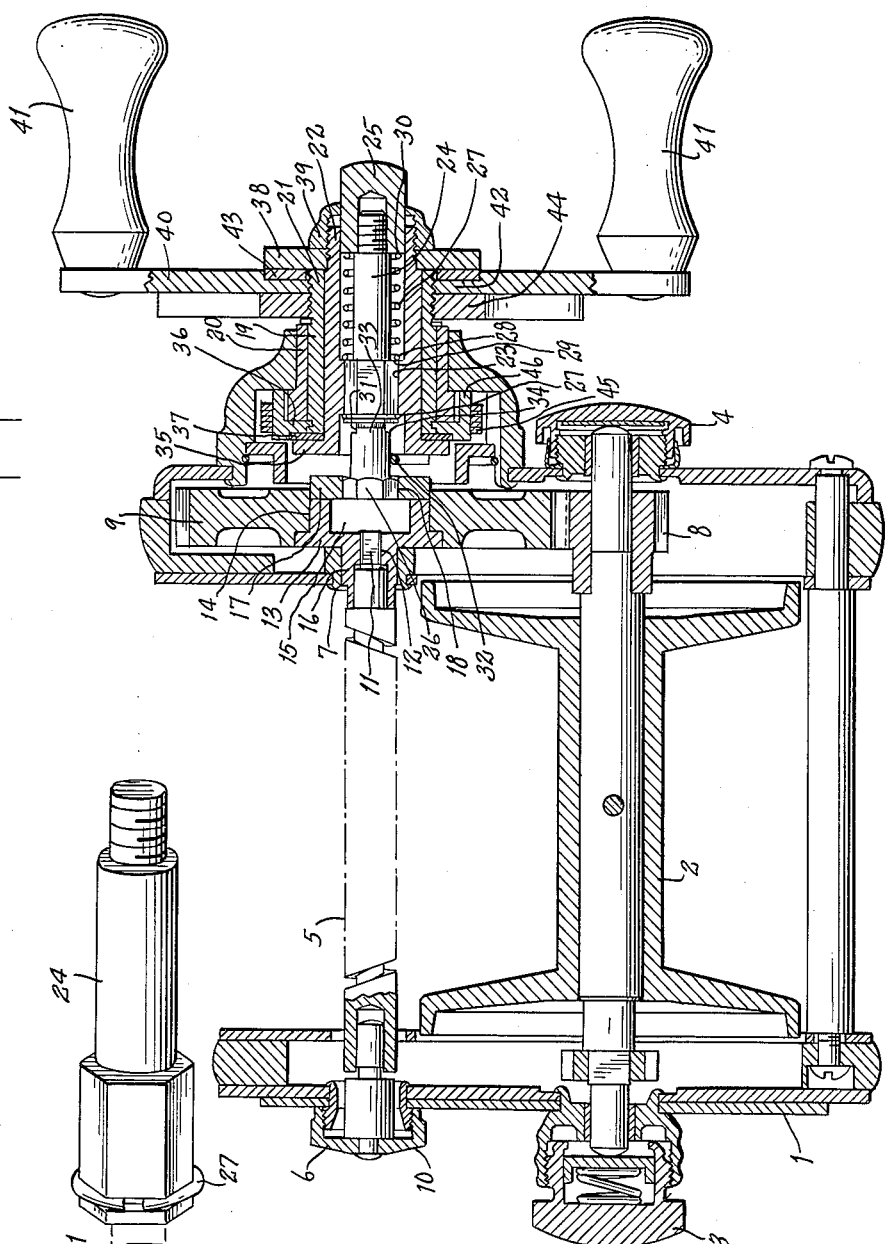
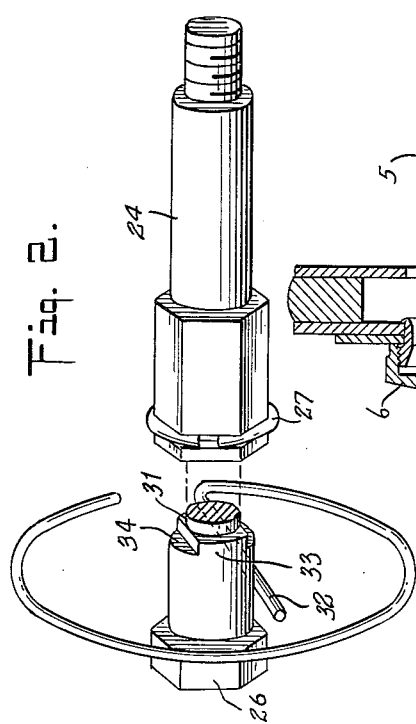
INVENTOR.
GARFIELD A. WOOD, JR.
BY
ATTORNEYS United States Patent Office 3,104,850
Patented Sept. 24, 1963

3,104,850
FREE SPOOL CASTING REEL
Garfield A. Wood, Jr., 4565 Sabal Palm Road, Bay Point, Miami, Fla.
Filed July 20, 1961, Ser. No. 125,513
11 Claims. (Cl. 242—84.45)

This invention relates to fishing reels and particularly to free spool casting reels and in particular those embodying star drags and level wind mechanisms.

One of the objects of the invention is to provide a free spool fishing reel with an effective rugged free spool mechanism.

Another object is to provide such a reel in which a level wind mechanism is incorporated and in which even though the spool is free from the driving mechanism the level wind mechanism is not thrown out of synchronism with the spool.

Another object of the invention is to provide such a reel with a simple and effective star drag mechanism.

Other objects and advantages of the invention will be apparent from the following specification and the accompanying drawings which disclose a preferred form of the invention as illustrative thereof and in which—

FIG. 1 is a detailed sectional view through a reel embodying the invention;

FIG. 2 is a detailed perspective view showing the plunger for freeing the drive mechanism from the spool and level wind and the holding means employed in holding the parts in disconnected condition.

The reel is of the type having a spool and level wind mechanism interconnected for simultaneous rotation by meshing gears. A driving mechanism for said gears is provided. It consists of a gear hub for one of said gears which has an axially disposed recess. A transverse wall extends across this recess and has an axially disposed squared driving aperture which opens into this recess.

Driving means are provided for the gear hub. They consist of a driven hub mounted in line with and coaxially of the gear hub for rotation coaxially with the gear hub. They consist of a cylindrical hollow outer member mounted for rotation coaxially of the gear hub and a cylindrical inner member mounted for relative rotary movement in the outer member. Adjustable star drag slip clutch means connect said inner and outer members and a crank is provided for rotating the outer member and hence the entire driving hub mechanism.

The inner member has a bore which receives a plunger which is slidably but non-rotatably mounted in said bore. It has a squared driving head which is of a size to fit in and drivingly engage the squared aperture in the gear hub or to be moved axially out of driving engagement and into the recess in the gear hub.

Stop means are provided on the driving hub and the plunger to stop the plunger in a position where the driving head and the squared aperture are in driving engagement and a plunger spring connects said hub and plunger and is biased to move the plunger to the position of driving engagement normally.

A manual member or button is provided on the plunger for moving it axially of the driving hub against the bias of the plunger spring to move the squared driving head out of driving engagement.

Means are provided for holding the plunger and head in non-driving position. They are a circumferential groove in the plunger and spring means mounted on the reel biased to enter into and engage in the groove when the plunger is moved to the non-driving position. These holding means hold the plunger against the bias of the plunger spring.

The groove has therein cam means adapted to engage the spring means on rotation of the driving hub to move the spring means out of the groove to permit the plunger to move to driving position under influence of the plunger spring.

The preferred cam means extend from the edge of the groove opposite to the direction of bias of the plunger spring partially across the groove. They have a high point flush with the surface of the plunger and on rotation of the plunger with the driving hub force the spring out of the groove.

The reel shown in the drawings has a conventional frame 1 in which a spool 2 is mounted for rotation in suitable bearings 3 and 4. A suitable level wind screw 5 is mounted in the frame for rotation in bearings 6 and 7. The level wind reversing screw shown is conventional, and the level wind carriage which is normally supplied and forms no part of this invention is not shown.

The spool is provided with a gear 8 and the level wind mechanism with a gear 9. These gears are constantly in mesh and are arranged in the reel to provide 4 turns of the spool for each rotation of the gear 9 which is directly rotated by the crank mechanism which will be later described.

In the reel shown the level wind can be removed by removing the cap 10 and removing the squared end 11 of the shaft 5 from the socket 12.

The gear 9 is driven by a gear hub 13 on which the gear 9 is fixed non-rotatably. The gear hub 13 is provided with cylindrical side walls 14 forming a recess 15 and has a shank 16 which is rotatably disposed in the bearing 7. A transverse wall 17 is disposed across the end of the gear hub 13. It is provided with a squared opening 18 which in this case is a hexagonal opening which opens into the recess 15 and serves as a driving connection for the gear hub and associated gearing mechanism.

A driving hub shown generally at 19 is mounted for rotation in the bearing 20 coaxially of the gear 9 and the gear hub 13. The driving hub consists of an outer member 21 which is of hollow cylindrical form and an inner cylindrical member 22 which is disposed for rotation in the member 21. The inner member 22 has a bore 23 which slidably and non-rotatably receives a plunger 24 which is provided with a cap or button 25 which protrudes from the end of the driving hub for manipulation to be described later.

The inner end of the plunger 24 is provided with a squared driving head 26 which is adapted to fit into the squared aperture 18 in the wall 17 to establish driving connection between the driving hub and the gear hub. The plunger is provided with a stop ring 27 adapted to stop movement of the plunger to the right as viewed in FIG. 1 when the driving head 26 is in engagement with the aperture 18.

A compression plunger spring 27 which surrounds the plunger 24 and bears at 28 on a shoulder 29 on the inner member 22 and at 30 on the cap 25 is normally biased to move the plunger to the right as indicated in FIG. 1 so that normally the driving head 26 is in driving engagement with the aperture 18. When the driving head is in this position driving connection is established between the driving hub and the gear hub.

In order to disrupt the driving connection the plunger 24 is moved to the left as viewed in FIG. 1 so that the driving head 26 moves into the recess 15 in the gear hub 13 and out of engagement with the aperture 18. Releasable means are provided for holding the parts in this disengaged position. They consist of a circumferential groove 31 in the plunger and a spring 32 mounted on the reel frame and biased to move into the groove 32 when the plunger is moved to disconnected position.

Means are provided for releasing the holding means after the cast has been made with a free spool. These means are operable on rotation of the driving hub and consist of cam means 33 which extend from the side of the groove 31 opposite the direction of bias of the spring 27 partially across the droove 31. These cam means have a high point forming a continuation of the surface of the plunger.

It will be understood that when the spring 32 has snapped into the groove 31 the plunger will be held in non-driving position. Upon rotation of the plunger through rotation of the driving hub the spring will move into the portion of the groove indicated at 34 and in line with the cam 33. Further rotation will cause the cam to lift the spring out of the groove so that the plunger spring 27 can move the plunger to move to the right as indicated in FIG. 1. The head 26 will eventually mate with and slip into the aperture 18.

The inner member and outer members 21 and 22 are connected through adjustable slip clutch mechanism forming a star drag. A flange 35 is provided at one end of the member 22 and a flange 36 opposed thereto is formed on member 21. Anti-friction material 37 is interposed between said flanges.

At the other end of the member 22 a flange is formed by a washer 38 which is held in position by a cap 39. A crank 40 having handles 41 and a flat central portion 42 opposes the washer or disk 38. Anti-friction material 43 is interposed between said disk or washer and the flat portion of the crank.

An adjustable nut or star drag member 44 is screw-threaded on the outer portion of the member 21. When it is screwed toward the crank member it tends to increase the frictional engagement between members 21 and 22. This is brought about because the movement of the nut 44 to the right as viewed in FIG. 1 presses the crank 40 and the interposed anti-friction material 43 against the washer or disk 38. At the same time the member 21 is urged to the left as viewed in FIG. 1 carrying the disk 36 against the anti-friction material 37 and pressing it against the flange 35. This increases the friction between the members 21 and 22 and increases the driving engagement between the crank 40 and the member 22. It, however, permits slippage when extraordinary forces are applied to the line.

Means are provided for preventing backward rotation of the crank. These comprise a coil spring 45 which is closely wrapped around a cylindrical portion 46 projecting from flange 36 in frictional engagement with the outer surface of said portion 46. One end of the spring is anchored to the reel and the spring is so coiled that motion of the crank in a line retrieving direction loosens the spring while rearward or unwinding motion of the crank tightens the spring around the member 46 holding it against further movement.

It will be appreciated that when the plunger 24 is moved to the left in FIG. 1 to disconnected position the spool is free from the drive mechanism. The spool and level wind, however, remain connected so that although the reel is free spool upon casting the synchronization between the spool and the level wind mechanism is not lost.

After the cast has been made, turning of the crank and the driving hub will release the holding mechanism and the plunger will move to the right and will eventually cause driving engagement between the driving hub and the gear hub.

The present invention may be embodied in other specific forms without departing from the spirit or essential attributes thereof. It is, therefore, desired that the present embodiment be considered in all respects as illustrative and not restrictive, reference being had to the appended claims rather than to the foregoing description to indicate the scope of the invention.

I claim:

1. In a fishing reel having a spool and a level wind mechanism interconnected for simultaneous rotation by meshing gears, a driving mechanism therefor comprising the combination of a gear hub for one of said gears having inwardly facing axially extending walls defining an axially disposed recess said gear hub having a transverse wall having inwardly facing axially extending walls defining an axially disposed squared driving aperture opening into said recess and driving means for said gear hub comprising a driving hub disposed for rotation co-axially of said gear hub and having a crank thereon, said driving hub having a bore therein and a driving plunger slidably and non-rotatably mounted in said bore having a squared driving head adapted to be moved into and to fit in and drivingly engage the inwardly facing axially extending walls defining the squared aperture in said gear hub or to be moved into said axial recess in said gear hub out of driving engagement, with said gear hub on sliding movement of said plunger, stop means on said driving hub and said plunger to stop said plunger in a position where the driving head and the squared aperture in said gear hub are in driving engagement, a plunger spring interconnecting said driving hub and plunger biased to move said plunger normally to said position of driving engagement, a manual member on said plunger for moving the same axially of said driving hub against the bias of said plunger spring to move said driving head out of driving engagement with said gear hub and into said recess and holding means for retaining said plunger and head in non-driving position, comprising a circumferential groove in said plunger and spring means mounted on said reel, biased to engage in said groove when the plunger is moved to non-driving position to hold said plunger against the bias of the plunger spring, said groove having cam means therein extending from the edge of the groove opposite to the direction of bias of said plunger spring partially across said groove and having a high point flush with the surface of said plunger adapted to engage said spring means on rotation of said driving hub to move said spring means out of groove engaging position to permit said plunger to move under plunger spring influence into gear hub driving position.

2. In a fishing reel having a spool and a level wind mechanism interconnected for simultaneous rotation by meshing gears, a driving mechanism therefor comprising the combination of a gear hub for one of said gears having inwardly facing axially extending walls defining an axially disposed recess, said gear hub having a transverse wall having inwardly facing axially extending walls defining an axially disposed squared driving aperture opening into said recess and driving means for said gear hub comprising a driving hub disposed for rotation co-axially of said gear hub and having a crank thereon, said driving hub having a bore therein and a driving plunger slidably and non-rotatably mounted in said bore having a squared driving head adapted to be moved into and to fit in and drivingly engage the inwardly facing axially extending walls defining the squared aperture in said gear hub or to be moved into said axial recess in said gear hub out of driving engagement with said gear hub on sliding movement of said plunger, stop means on said driving hub and said plunger to stop said plunger in a position where the driving head and the squared aperture in said gear hub are in driving engagement, a plunger spring interconnecting said driving hub and plunger biased to move said plunger normally to said position of driving engagement, a manual member on said plunger for moving the same axially of said driving hub against the bias of said plunger spring to move said driving head out of driving engagement with said gear hub and into said recess and holding means for retaining said plunger and head in non-driving position, comprising a circumferential groove in said plunger and spring means mounted on said reel, biased to engage in said groove when the plunger is moved to non-driving position to hold said plunger against the bias of the plunger spring, said groove having cam means therein adapted to engage said spring means on rotation of said driving hub to move said spring means out of groove engaging position to permit said plunger to move under plunger spring influence into gear hub driving position.

3. In a fishing reel having a spool and a level wind mechanism interconnected for simultaneous rotation by meshing gears, a driving mechanism therefor comprising the combination of a gear hub for one of said gears having an axially disposed squared driving aperture and driving means for said gear hub comprising a driving hub disposed for rotation co-axially of said gear hub and having a crank thereon, said driving hub having a bore therein and a driving plunger slidably and non-rotatably mounted in said bore having a squared driving head adapted to be moved into and to fit in and drivingly engage the squared aperture in said gear hub or to be moved out of driving engagement with said gear hub on sliding movement of said plunger, stop means on said driving hub and said plunger to stop said plunger in a position where the driving head and the squared aperture in said gear hub are in driving engagement, a plunger spring interconnecting said driving hub and plunger biased to move said plunger normally to said position of driving engagement, a manual member on said plunger for moving the same axially of said driving hub against the bias of said plunger spring to move said driving head out of driving engagement with said gear hub and holding means for retaining said plunger and head in non-driving position, comprising a circumferential groove in said plunger and spring means mounted on said reel, biased to engage in said groove when the plunger is moved to non-driving position to hold said plunger against the bias of the plunger spring, said groove having cam means therein extending from the edge of the groove opposite to the direction of bias of said plunger spring partially across said groove and having a high point flush with the surface of said plunger adapted to engage said spring means on rotation of said driving hub to move said spring means out of groove engaging position to permit said plunger to move under plunger spring influence into gear hub driving position.

4. In a fishing reel having a spool and a level wind mechanism interconnected for simultaneous rotation by meshing gears, a driving mechanism therefor comprising the combination of a gear hub for one of said gears having an axially disposed squared driving aperture and driving means for said gear hub comprising a driving hub disposed for rotation coaxially of said gear hub and having a crank thereon, said driving hub having a bore therein and a driving plunger slidably and non-rotatably mounted in said bore having a squared driving head adapted to be moved into and to fit in and drivingly engage the squared aperture in said gear hub or to be moved out of driving engagement with said gear hub on sliding movement of said plunger, stop means on said driving hub and said plunger to stop said plunger in a position where the driving head and the squared aperture in said gear hub are in driving engagement, a plunger spring interconnecting said driving hub and plunger biased to move said plunger normally to said position of driving engagement, a manual member on said plunger for moving the same axially of said driving hub against the bias of said plunger spring to move said driving head out of driving engagement with said gear hub and holding means for retaining said plunger and head in non-driving position comprising a circumferential groove in said plunger and spring means mounted on said reel, biased to engage in said groove when the plunger is moved to non-driving position to hold said plunger against the bias of the plunger spring, said groove having cam means therein adapted to engage said spring means on rotation of said driving hub to move said spring means out of groove engaging position to permit said plunger to move under plunger spring influence into gear hub driving position.

5. In a fishing reel having a spool and a level wind mechanism interconnected for simultaneous rotation by meshing gears, a driving mechanism therefore comprising the combination of a gear hub for one of said gears having an axially disposed squared driving aperture and driving means for said gear hub comprising a driving hub disposed for rotation co-axially of said gear hub and having a crank thereon, said driving hub having a bore therein and a driving plunger slidably and non-rotatably mounted in said bore having a squared driving head adapted to be moved into and to fit in and drivingly engage the squared aperture in said gear hub or to be moved out of driving engagement with said gear hub on sliding movement of said plunger, stop means on said driving hub and said plunger to stop said plunger in a position where the driving head and the squared aperture in said gear hub are in driving engagement, a plunger spring interconnecting said driving hub and plunger biased to move said plunger normally to said position of driving engagement, a manual member on said plunger for moving the same axially of said driving hub against the bias of said plunger spring to move said driving head out of driving engagement with said gear hub and holding means for retaining said plunger and head in non-driving position and means operable by rotation of said driving hub to release said holding means.

6. In a fishing reel, a driving mechanism comprising the combination of a driven member having an axially disposed squared driving aperture and driving means for said driven member comprising a driving hub disposed for rotation co-axially of said driven member and having a crank thereon, said driving hub having a bore therein and a driving plunger slidably and non-rotatably mounted in said bore having a squared driving head adapted to fit in and drivingly engage the aperture in said driven member or to be moved out of driving engagement with said driven member on sliding movement of said plunger, stop means on said driving hub and said plunger to stop said plunger in a position where the driving head and the squared aperture in said gear hub are in driving engagement, a plunger spring interconnecting said driving hub and plunger biased to move said plunger normally to said position of driving engagement, a manual member on said plunger for moving the same axially of said driving hub against the bias of said plunger spring to move said driving head out of driving engagement with said gear hub and means for retaining said plunger and head in non-driving position, comprising a circumferential groove in said plunger and spring means mounted on said reel, biased to engage in said groove when the plunger is moved to non-driving position to hold said plunger against the bias of the plunger spring, said groove having cam means therein extending from the edge of the groove opposite to the direction of bias of said plunger spring partially across said groove and having a high point flush with the surface of said plunger adapted to engage said spring means on rotation of said driving hub to move said spring means out of groove engaging position to permit said plunger to move under plunger spring influence into position to drive said driven member.

7. In a fishing reel, a driving mechanism comprising the combination of a driven member having an axially disposed squared driving aperture and driving means for said driven member comprising a driving hub disposed for rotation co-axially of said driven member and having a crank thereon, said driving hub having a bore therein and a driving plunger slidably and non-rotatably mounted in said bore having a squared driving head adapted to fit in and drivingly engage the aperture in said driven member or to be moved out of during engagement with said driven member on sliding movement of said plunger, stop means on said driving hub and said plunger to stop said plunger in a position where the driving head and the squared aperture in said gear hub are in driving engagement, a plunger spring interconnecting said driving hub and plunger biased to move said plunger normally to said position of driving engagement, a manual member on said plunger for moving the same axially of said driving hub against the bias of said plunger spring to move said driving head out of driving engagement with said gear hub and means for retaining said plunger and head in non-driving position, comprising a circumferential groove in said plunger and spring means mounted on said reel, biased to engage in said groove when the plunger is moved to non-driving position to hold said plunger against the bias of the plunger spring, said groove having cam means therein adapted to engage said spring means on rotation of said driving hub to move said spring means out of groove engaging position to permit said plunger to move under plunger spring influence into position to drive said driven member.

8. In a fishing reel having a spool and a level wind mechanism interconnected for simultaneous rotation by meshing gears, a driving mechanism therefor comprising the combination of a gear hub for one of said gears having inwardly facing axially extending walls defining an axially disposed recess, said gear hub having a transverse wall having inwardly facing axially extending walls defining an axially disposed squared driving aperture opening into said recess and driving means for said gear hub comprising a driving hub dsposed for rotation co-axially of said gear hub comprising a cylindrical hollow outer member mounted for rotation co-axially of said gear hub, a cylindrical inner member mounted for relative rotary movement in said outer member and having a bore therein, adjustable slip clutch means connecting said inner and outer members, a crank for rotating said outer member, a driving plunger slidably and non-rotatably mounted in said bore having a squared driving head adapted to be moved into and to fit in and drivingly engage the inwardly facing axially extending walls defining the squared aperture in said gear hub or to be moved into said axial recess in said gear hub out of driving engagement with said gear hub on sliding movement of said plunger, stop means on said driving hub and said plunger to stop said plunger in a position where the driving head and the squared aperture in said gear hub are in driving engagement, a plunger spring interconnecting said driving hub and plunger biased to move said plunger normally to said position of driving engagement, a manual member on said plunger for moving the same axially of said driving hub against the bias of said plunger spring to move said driving head out of driving engagement with said gear hub and into said recess and holding means for retaining said plunger and head in non-driving position comprising a circumferential groove in said plunger and spring means mounted on said reel, biased to engage in said groove when the plunger is moved to non-driving position to hold said plunger against the bias of the plunger spring, said groove having cam means therein adapted to engage said spring means on rotation of said driving hub to move said spring means out of groove engaging position to permit said plunger to move under plunger spring influence into gear hub driving position.

9. In a fishing reel having a spool and a level wind mechanism interconnected for simultaneous rotation by meshing gears, a driving mechanism therefor comprising the combination of a gear hub for one said gears having inwardly facing axially extending walls defining an axially disposed recess, said gear hub having a transverse wall having inwardly facing axially extending wall defining an axially disposed squared driving aperture opening into said recess and driving means for said gear hub comprising a driving hub disposed for rotation co-axially of said gear hub comprising a cylindrical hollow outer member mounted for rotation co-axially of said gear hub, a cylindrical inner member mounted for relative rotary movement in said outer member and having a bore therein, adjustable slip clutch means connecting said inner and outer members, a crank for rotating said outer member, a driving plunger slidably and non-rotatably mounted in said bore having a squared driving head adapted to be moved into and to fit in and drivingly engage the inwardly facing axially extendng walls defining the squared aperture in said gear hub or to be moved into said axial recess in said gear hub out of driving engagement with said gear hub on sliding movement of said plunger, stop means on said driving hub and said plunger to stop said plunger in a position where the driving head and the squared aperture in said gear hub are in driving engagement, a plunger spring interconnecting said driving hub and plunger biased to move said plunger normally to said position of driving engagement, a manual member on said plunger for moving the same axially of said driving hub against the bias of said plunger spring to move said driving head out of driving engagement with said gear hub and into said recess and holding means for retaining said plunger and head in said nondriving position and means operable by rotation of said driving hub to release said holding means.

10. In a fishing reel having a spool and a level wind mechanism interconnected for simultaneous rotation by meshing gears, a driving mechanism therefor comprising the combination of a gear hub for one of said gears having an axially disposed squared driving aperture and driving means for said gear hub comprising a driving hub disposed for rotation co-axially of said gear hub comprising a cylindrical hollow outer member mounted for rotation co-axially of said gear hub, a cylindrical inner member mounted for relative rotary movement in said outer member and having a bore therein, adjustable slip clutch means connecting said inner and outer members, a crank for rotating said outer member, a driving plunger slidably and non-rotatably mounted in said bore having a squared driving head adapted to be moved into and to fit in an drivingly engage the squared aperture in said gear hub or to be moved out of driving engaged with said gear hub on sliding movement of said plunger, stop means on said driving hub and said plunger to stop said plunger in a position where the driving head and the squared aperture in said gear hub are in driving engagement, a plunger spring interconnecting said driving hub and plunger biased to move said plunger normally to said position of driving engagement, a manual member on said plunger for moving the same axially of said driving hub against the bias of said plunger spring to move said driving head out of driving engagement with said gear hub and holding means for retaining said plunger and head in said non-driving position, comprising a circumferential groove in said plunger and spring means mounted on said reel, biased to engage in said groove when the plunger is moved to non-driving position to hold said plunger against the bias of the plunger spring, said groove having cam means therein adapted to engage said spring means on rotation of said driving hub to move said spring means out of groove engaging position to permit said plunger to move under plunger spring influence into gear hub driving position.

11. In a fishing reel having a spool and a level wind mechanism interconnected for simultaneous rotation by meshing gears, a driving mechanism therefor comprising the combination of a gear hub for one of said gears having an axially disposed squared driving aperture and driving means for said gear hub comprising a driving hub disposed for rotation co-axially of said gear hub comprising a cylindrical hollow outer member mounted for rotation co-axially of said gear hub, a cylindrical inner member mounted for relative rotary movement in said outer member and having a bore therein, adjustable slip clutch means connecting said inner and outer members, a crank for rotating said outer member, a driving plunger slidably and nonrotatably mounted in said bore having a squared driving head adapted to be moved into and to fit in and drivingly engage the squared aperture in said gear hub or to be moved out of driving engagement with said gear hub on sliding movement of said plunger, stop means on said driving hub and said plunger to stop said plunger in a position where the driving head and the squared aperture in said gear hub are in driving engagement, a plunger spring interconnecting said driving hub and plunger biased to move said plunger normally to said position of driving engagement, a manual member on said plunger for moving the same axially of said driving hub against the bias of said plunger spring to move said driving head out of driving engagement with said gear hub and holding means for retaining said plunger and head in said non-driving position, comprising a circumferential groove in said plunger and spring means mounted on said reel, biased to engage in said groove when the plunger is moved to non-driving position to hold said plunger against the bias of the plunger spring, said groove having cam means therein adapted to engage said spring means on rotation of said driving hub to move said spring means out of groove engaging position to permit said plunger to move under plunger spring influence into gear hub driving position.

References Cited in the file of this patent
UNITED STATES PATENTS

| | | |
|---|---|---|
| 1,547,238 | Russell et al. | July 28, 1925 |
| 1,854,804 | Olander | Apr. 19, 1932 |
| 2,124,634 | Russell et al. | July 26, 1938 |
| 2,568,245 | McDonald | Sept. 18, 1951 |
| 3,051,409 | Sarah | Aug. 28, 1962 |